Patented May 18, 1948

2,441,816

UNITED STATES PATENT OFFICE 2,441,816

ACYLATION OF HALOGEN SUBSTITUTED SULFOACIDS AND SALTS

Donald F. Holloway and Kurt H. Spitzmueller, Chicago, Ill., assignors to Industrial Patents Corporation, Chicago, Ill., a corporation of Delaware No Drawing. Application September 21, 1944, Serial No. 555,192

10 Claims. (Cl. 260—400)

This invention relates to the preparation of synthetic detergents and more particularly to the preparation of salts of organic sulfates and sulfonic acids relatively free from inorganic salts formed as by-products in their manufacture.

A large number of organic sulfate and sulfonate derivatives have recently been developed for use as detergents and as substitutes for the ordinary soaps. These new compounds are particularly characterized by their surface activity and stability in the presence of calcium and magnesium ions of hard water.

Most methods commonly employed for the manufacture of these materials involve the incidental formation of organic or inorganic salts as by-products of the reaction. For example, the formation of the organic sulfonates usually involves treating the chlorinated organic derivatives with sodium sulfite to concomitantly form sodium chloride. Also, in the formation of acylated detergents, the fatty acid acyl groups are generally introduced by reacting the sodium salt of the acid with the chlorinated organic derivative, resulting in a double decomposition reaction with the formation of sodium chloride as an impurity.

The purification of synthetic detergents is ordinarily a troublesome as well as an expensive operation. The application of conventional refining methods has not been entirely satisfactory in effecting the substantially complete elimination of salt impurities to form a pure product. The incomplete removal of residual salts adversely affects the detergent and surface active properties of the product and, moreover, is objectionable when the compounds are to be utilized in chemical reactions where a high degree of purity is essential.

Various methods have been proposed in the prior art for purifying synthetic detergents by treatment in a common solvent for the detergent and impurities with alcohols and similar solvents at relatively low temperatures. The high cost of alcohol solvents renders such treatments impractical from the expense standpoint. Moreover, the procedure utilized in these prior treatments is usually highly involved because of the partial miscibility of most alcohols with aqueous solutions of the salts.

The present invention contemplates the preparation of acylated organic sulfate and sulfonate derivatives by carrying out the acylating reaction in a medium comprising a hydrocarbon solvent at an elevated temperature, for example, above the boiling point of water at the particular conditions. In this case, the acylated derivatives dissolve in the hydrocarbon medium as they are formed and the salt-like impurities are simultaneously precipitated. The precipitated salts are then removed by filtration, centrifuging, or decantation and the solvent containing the detergent may be sprayed into a low pressure zone wherein the solid material is precipitated and the solvent recovered.

A suitable solvent for the purpose of the invention is preferably one having a boiling range between about 100° C. to about 400° C. or higher. It has been found that temperatures in excess of 100° C. are required to effect reaction between the acylating material and the salts of the organic sulfates and sulfonic acid derivatives in the solvent. When operating under atmospheric pressures, the solvent should have an initial boiling point at least about as high as the reaction temperature and an end boiling point as low as practical for commercial solvents. If the operation is carried out under pressure lower boiling range solvents may be used providing sufficient pressure is used to maintain the solvent in the liquid phase. A hydrocarbon solvent consisting of a petroleum fraction having a boiling range of from 190° C. to 220° C. has been found to be satisfactory. Other hydrocarbon solvents found to be suitable are toluene, xylene, mesitylene, amyl benzene, octane, nonane, decane, undecane, dodecane, gas oil, kerosene, Deobase and decalin.

The invention is applicable to the preparation of acylated salts of organic sulfates and sulfonic acids wherein the final step involves treatment with a neutral salt of a fatty acid. In the preparation of these compounds the salts of the organic sulfate or salts of the sulfonic acids are acylated with the fatty acid salt to yield an acylated salt of the organic sulfate or sulfonic acid. It is unnecessary to start with the pure salts of the organic sulfate or sulfonic acids. It is contemplated that products containing various amounts of impurities such as sodium chloride, sodium sulfate, sodium sulfite and sodium bisulfite, which may be present as by-products from the preparation of said salts, may be used. In accordance with the invention, such salt impurities may be eliminated to produce a high degree of purity in the final product by carrying out the acylation in the presence of hydrocarbon solvent at a sufficiently elevated temperature to facilitate solution of the final product in the solvent.

Acylating materials that may be used in the invention are metal salts preferably alkali metal salts such as sodium and potassium salts of higher fatty acids, for example fatty acids of about 8 to 22 carbon atoms. Other salts contemplated are fatty acid salts of organic bases such as mono-, di- and tri-ethanolamine and other organic amines.

Example 1

23.7 grams of β chloro-β sodium sulfo ethylether of 88 per cent purity were heated with 30.9 grams of sodium tallow soap while stirring in an inert atmosphere with 200 milliliters of hydrocarbon solvent at a temperature of 190° C. The solvent employed had a boiling range of from 200° C. to 250° C. After a period of 3 hours, the reaction was found to be about 97 per cent complete. The salts were permitted to settle and the clear liquor was removed by decantation. The solvent was then recovered by spray drying the solution in an evacuated chamber maintained at 2 millimeters of mercury pressure at a temperature of 150° C. A substantially salt-free product was recovered consisting of β-sodium sulfo β ethoxyethyl esters of the tallow fatty acids.

Example 2

134 grams of the crude reaction product of ββ' dichlorethyl ether and sodium sulfite containing 0.3 mol of β chloro β' sodium sulfo ethylether and 91.5 grams of sodium tallow soap were heated in 500 milliliters of a hydrocarbon solvent having a boiling range of from 200° C. to 250° C. at a temperature of 190° C. in an inert atmosphere while stirring for 3 hours. The solvent was removed from the precipitated solids by decantation and spray dried into a vacuum chamber maintained at a pressure of 2 millimeters of mercury and a temperature of 150° C. The compound recovered consisted of substantially pure anhydrous β sodium sulfo-β-ethoxyethyl esters of the tallow fatty acids. In preparing the compounds directly in the solvent medium, an outstanding advantage is that the desired derivatives are directly recovered in a high state of purity substantially free from inorganic and/or organic salts, as well as other impurities insoluble in the medium.

Example 3

196.5 grams of α-chloro α-sodium sulfo glycerol were mixed with 201 grams of sodium tallow soap while stirring in an inert atmosphere with 2 liters of hydrocarbon solvent at a temperature of 190° C. The solvent employed had a boiling range of about 200° C. to 250° C. After a period of several hours, the reaction was found to be complete as evidenced by the constancy of the sodium chloride concentration. The salts were permitted to settle and the clear liquor was removed by siphoning. The solvent was then recovered by spray drying the solution in an evacuated chamber maintained at 2 millimeters of mercury pressure at a temperature of 150° C. A substantially salt free product was recovered consisting of x-sodium sulfo-x' fatty acid ester of glycerol.

Example 4

166.1 grams of α-chloro β-sodium sulfo-ethane and 279 grams of sodium palmitate dissolved in 1500 milliliters of a hydrocarbon solvent having a boiling range of about 190° C. to 250° C. were heated to about 190° C. in an inert atmosphere while stirring for 3 hours. The solution was removed from the precipitated salts by decantation and spray dried in a vacuum chamber maintained at a pressure of 2 millimeters of mercury and a temperature of 150° C. The compound recovered consisted of substantially pure β-sodium sulfo ethyl-palmitate.

Obviously, many modifications and variations of the invention hereinbefore set forth may be made without departing from the spirit and scope thereof, and therefore, only such limitations should be imposed as are indicated in the appended claims.

We claim:

1. A process for the preparation of acylated organic sulfate and sulfonate salts which comprises: treating halogen-substituted sulfo-acids and salts thereof with the salt of an acylating substance under substantially anhydrous conditions in the presence of a hydrocarbon solvent at an acylating temperature above the boiling point of water, said hydrocarbon solvent having its boiling point above the acylating temperature and being present in sufficient quantity to dissolve the acylated derivative and form a substantially pure hydrocarbon solution of the acylated derivative free of inorganic salts and side reaction products, whereby the resulting acylated products are dissolved in the solvent and impurities are precipitated; and separating the said impurities from the solution.

2. A process according to claim 1 in which the hydrocarbon solvent is a petroleum fraction having a boiling range of about 190° C. to 220° C.

3. A process for the preparation of acylated organic sulfate and sulfonate salts which comprises: treating halogen-substituted sulfo-acids and salts thereof with a salt of a fatty acid; heating the resulting product under substantially anhydrous conditions to an acylating reaction temperature above the boiling point of water in the presence of a hydrocarbon solvent having its boiling point above the acylating temperature, said hydrocarbon solvent being present in sufficient quantity to dissolve the acylated derivative and form a substantially pure hydrocarbon solution of the acylated derivative free of inorganic salts and side reaction products, whereby inorganic salts are precipitated; and separating the precipitated inorganic salts from the solution.

4. A process according to claim 3 in which the heating temperature in the presence of the hydrocarbon solvent is about 200° C. to 250° C.

5. A process for the preparation of synthetic detergents which comprises: subjecting a chlorinated sulfo-ether and a metal salt of a higher fatty acid under substantially anhydrous conditions to a temperature above the boiling point of water in the presence of a hydrocarbon solvent, whereby an acylated derivative of the chlorosulfonated ethyl ether soluble in the hydrocarbon solvent and a salt insoluble in the hydrocarbon solvent salt are formed, said hydrocarbon solvent having its boiling point above the reaction temperature and being present in sufficient quantity to dissolve the acylated derivative and to form a substantially pure hydrocarbon solution of the acylated derivative free of inorganic salts and side reaction products; separating the salt from the resulting hydrocarbon solution; and recovering said acylated derivative from the hydrocarbon.

6. A process according to claim 5 in which the chlorinated sulfo-ether is β-chloro-β-sodium sulfo-ethyl-ether.

7. A process according to claim 5 in which the metal salt of a higher fatty acid is sodium tallow soap.

8. A process for the preparation of synthetic detergents which comprises: treating under substantially anhydrous conditions a chloro-sulfonated glycerol with an alkali metal salt of a fatty acid above the boiling point of water in the presence of a hydrocarbon solvent, said hydrocarbon solvent having its boiling point above the reaction temperature and being present in sufficient quantity to dissolve the acylated derivative and to form a substantially pure hydrocarbon solution of the acylated derivative free of inorganic salts and side reaction products, whereby a sodium sulfo fatty acid ester of glycerol and alkali metal chloride is formed; and separating the insoluble metal chloride from the hydrocarbon solution of the acylated glycerol ester.

9. A process according to claim 8 in which the chloro-sulfonated glycerol is $\alpha$-chloro-$\alpha$-sodium sulfo-glycerol.

10. A process for the preparation of synthetic detergents which comprises: reacting under substantially anhydrous conditions chloro-sulfonated ethane with a sodium salt of a fatty acid in the presence of a hydrocarbon solvent, said hydrocarbon solvent having its boiling point above the reaction temperature and present in sufficient quantity to dissolve the acylated derivative and form a substantially pure hydrocarbon solution of the acylated derivative free of inorganic salts and side reaction products, whereby the chloro-sulfonated ethane is acylated to form a solution of acylated derivative in the hydrocarbon solvent and an insoluble sodium chloride; separating the sodium chloride; and recovering the acylated derivative from the hydrocarbon solvent.

DONALD F. HOLLOWAY.
KURT H. SPITZMUELLER.

REFERENCES CITED

The following references are of record in the file of this patent:

UNITED STATES PATENTS

| Number | Name | Date |
|---|---|---|
| 2,316,719 | Russell | Apr. 13, 1943 |
| 2,328,931 | Steik | Sept. 7, 1943 |
| 2,342,563 | Tucker | Feb. 22, 1944 |